2,789,903

PROCESS FOR PRODUCTION OF SHAPED ARTICLES COMPRISING FIBROUS PARTICLES AND A COPOLYMER OF VINYL ACETATE AND AN ETHYLENICALLY UNSATURATED ACID

John C. Lukman, Morristown, and Irving E. Muskat, Plainfield, N. J., assignors to Celanese Corporation of America, New York, N. Y., a corporation of Delaware No Drawing. Application September 2, 1954,
Serial No. 453,949

5 Claims. (Cl. 92—21)

This invention relates to the production of shaped articles and relates more particularly to the production of shaped articles of fibrous material.

It is an object of this invention to provide a novel and economical process for the production of shaped articles of fibrous material.

Other objects of this invention will be apparent from the following detailed description and claims.

In accordance with this invention there is prepared an aqueous slurry containing fibrous particles and a water-insoluble polymer of vinyl acetate. This slurry is placed in contact with a foraminous element, such as a screen, and is subjected to pressure for the removal of most of the water of said slurry through the apertures of the foraminous element. The resulting shaped article is dried and then pressed at an elevated temperature.

The aqueous slurry employed in the practice of this invention is prepared advantageously by adding an aqueous dispersion of a polymer of vinyl acetate to a suspension of the fibrous particles in water or, if desired, to the water used for making said suspension of fibrous particles. The proportion of the dispersion of polymer of vinyl acetate is suitably such that there are present about 2 to 50 parts, preferably about 3 to 20 parts, by weight of said polymer for each 100 parts by weight of the fibrous particles. The proportion of fibrous particles in the slurry may be varied widely. Thus, the slurry may contain about 0.25 to 20%, preferably about 0.5 to 5.0%, by weight of fibrous particles.

The polymer of vinyl acetate used in this invention may be a homopolymer of vinyl acetate or a copolymer of vinyl acetate and another monoethylenically unsaturated compound copolymerizable therewith. Examples of such other monomers suitable for making copolymers for use in this invention are esters, such as methyl acrylate, methyl methacrylate, methyl ethacrylate, methyl chloroacrylate, ethyl crotonate, allyl acetate, vinyl propionate or vinyl butyrate, ketones such as methyl vinyl ketone or methyl isopropenyl ketone, halides such as vinyl chloride or vinylidene chloride. When a copolymer is employed, said copolymer advantageously contains at least 90% of vinyl acetate polymerized therein. Particularly good results are obtained when the polymer of vinyl acetate is a water-insoluble acidic copolymer, i. e. a copolymer of vinyl acetate and an ethylenically unsaturated acid, which acid may be monobasic or polybasic. Examples of suitable ethylenically unsaturated acids which may be copolymerized with vinyl acetate are crotonic acid, acrylic acid, chloroacrylic acid, methacrylic acid, maleic acid, fumaric acid, itaconic acid, partial esters of ethylenically unsaturated polybasic acids such as monobutyl maleate or monoethyl itaconate, and amic acids such as maleamic acid or itaconamic acid.

As stated the polymer of vinyl acetate employed in the practice of this invention is used advantageously in the form of an aqueous dispersion thereof. For example, there may be employed an emulsion of the polymer in which the size of the polymer particles ranges from 0.25 to 4 microns. This emulsion may contain small amounts of any of the usual emulsifying or wetting agents such as polyvinyl alcohol, gum arabic, gum tragacanth, hydroxymethyl cellulose, methyl cellulose, soaps, alkyl aryl sulfonic compounds such as isobutyl naphthalene sulfonic acid, sulfate esters such as sodium lauryl sulfate, Turkey red oil or dioctyl sodium sulfosuccinate, and non-ionic wetting agents such as the reaction products of ethylene oxide with higher fatty acids or higher fatty amides or higher fatty alcohols. When an acidic copolymer, as described above is employed, such copolymer is preferably as least partially neutralized with an alkaline material before the dispersion of the copolymer is mixed with the fibrous particles. Thereafter, the aqueous mixture of at least partially neutralized copolymer and fibrous particles is acidified preferably to a pH below 6.5 to cause the copolymer to precipitate on said fibrous particles. In this case, the aqueous dispersion of at least partially neutralized copolymer may be a solution of said copolymer or it may be an emulsion of discrete particles of the copolymer. The precipitation by acid causes practically all of the copolymer to be deposited on the fibrous material so that substantially none of the copolymer is lost when the water is removed from the slurry. Acids suitable for the acidification of the mixture include acetic, hydrochloric, sulfuric, or formic acids.

The fibrous particles employed in the practice of this invention may be of any desired type, such as fibers of cellulose material, e. g. ground wood, hemp, or shredded paper, glass, nylon, asbestos, polyethylene terephthalate, cellulose acetate or mixtures of these materials with each other in any desired proportions. Particularly good results are obtained when there are used the fine particles known as wood wool, having a particle size of about 5 to 20 mesh and made from any desired type of wood, e. g. hard woods such as oak or soft woods such as pine, alone or mixed with kraft pulp, newsprint pulp or shredded paper.

In one embodiment of this invention the aqueous slurry containing the fibrous particles and the water-insoluble polymer of vinyl acetate is deposited on a screen or other suitable filtering material and superatmospheric pressure is applied to the deposit to force out most of the water therefrom, using, for example, the apparatus described in U. S. Patent No. 2,581,210. In another embodiment, the removal of most of the water is effected by subjecting one side of the screen to subatmospheric pressure so as to draw the deposit of fibrous particles and polymer tightly against the other side of said screen. The screen or other filtering material may be of any shape and size, depending on the shape and size of the desired product. After most of the water has been removed from the mixture by the application of superatmospheric or subatmospheric pressure the shaped mixture may be dried in any suitable manner, for example, in the atmosphere at room temperature or in an oven. The dried material is then pressed at an elevated temperature, for example a pressure of 200 to 5000 pounds per square inch and a temperature of 30 to 100° C. may be employed.

If desired, the water removed when the slurry is deposited on the screen may be recycled by using it as a component of subsequent portions of the slurry. This water may contain dispersed therein appreciable amounts of the water-insoluble polymer of vinyl acetate, particularly when no acid precipitation treatment is employed, so that recycling as described above materially reduces the amount of fresh polymer which it is necessary to add to the slurry.

Shaped articles produced according to the process of this invention are tough and strong and may be employed for a wide variety of uses. They have been found to be very suitable for use as wall boards or book covers, for example.

The following examples are given to illustrate this invention further:

*Example I*

1 part by weight of an aqueous emulsion containing 55% of polyvinyl acetate in the form of particles about 1 micron in size, and also containing about ½% of dioctyl sodium sulfosuccinate and about 2% of polyvinyl alcohol, is added to 270 parts by weight an aqueous slurry containing 2% of wood wool. The resulting mixture containing about 2.2% of solids is deposited on a screen and subjected to a pressure of about 30 pounds per square inch gauge to produce a sheet about ½ inch in thickness. The sheet is dried and pressed at a temperature of about 80° C. and a pressure of about 1000 pounds per square inch. The dried sheet contains about 10% of polyvinyl acetate. Comparison with a sheet made in an identical manner, but using no polyvinyl acetate, shows that the use of the polyvinyl acetate causes a 60% improvement in tensile strength and an 8% improvement in elongation at break.

*Example II*

A copolymer of 87% vinyl acetate and 3% crotonic acid is dissolved in an aqueous solution containing about 0.3% of ammonia to form a solution containing 20% of the copolymer. 3 parts by weight of this solution is added to 270 parts by weight of an aqueous slurry containing 2% of wood wool and the resulting mixture is agitated for 15 minutes, following which acetic acid is added in an amount sufficient to reduce the pH of the mixture to 5.5. The resulting mixture is then deposited on a screen, subjected to pressure and then dried, all as in Example I. The tensile strength of the resulting sheet is more than 10% greater than the tensile strength of the sheet produced in accordance with Example I and containing polyvinyl acetate.

*Example III*

Example II is repeated except that the copolymer is used in the form of an emulsion of discrete particles rather than a solution. The copolymer emulsion is made by first dissolving 40 parts of the copolymer in 60 parts of a dilute aqueous solution of ammonia, and thereafter heating the resulting solution to 60 to 70° C. while vigorously agitating the same to cause ammonia to be driven off until a dispersion whose particle size is about 0.4 microns is produced.

It is to be understood that the foregoing detailed description is given merely by way of illustration and that many variations may be made therein without departing from the spirit of our invention.

Having described our invention what we desire to secure by Letters Patent is:

1. Process for the production of shaped articles which comprises mixing fibrous particles and an aqueous dispersion of a water-insoluble at least partially neutralized acidic copolymer of vinyl acetate and an ethylenically unsaturated acid to form a copolymer-containing slurry, acidifying said mixture to precipitate said acidic copolymer in said slurry, placing said slurry in contact with a foraminous element and subjecting said slurry to pressure to remove most of the water of said slurry through the apertures of said foraminous element.

2. Process for the production of shaped articles, which comprises preparing a slurry by mixing fibrous material comprising wood particles of about 5 to 20 mesh size and an aqueous dispersion comprising about 3 to 20%, based on the weight of said particles, of a water-insoluble at least partially neutralized acidic copolymer of vinyl acetate and an ethylenically unsaturated monocarboxylic acid, acidifying said slurry by the addition of an acid to precipitate said acidic copolymer on said wood particles, placing said slurry in contact with a foraminous element and subjecting said slurry to pressure to remove most of the water of said slurry through the apertures of said foraminous element.

3. Process as set forth in claim 2 in which said aqueous dispersion is an alkaline solution of said acidic copolymer.

4. Process as set forth in claim 2 in which said aqueous dispersion is an emulsion of said at least partially neutralized acidic copolymer and said acid is selected from the group consisting of acetic, hydrochloric, sulfuric and formic acids.

5. Process as set forth in claim 2 in which the resulting product is dried and then pressed at an elevated temperature.

References Cited in the file of this patent

UNITED STATES PATENTS

| 1,595,312 | O'Brien | Aug. 10, 1926 |
| 1,836,021 | Gibbons | Dec. 15, 1931 |
| 1,919,697 | Groff | July 25, 1933 |
| 2,563,897 | Wilson et al. | Aug. 14, 1951 |

FOREIGN PATENTS

| 510,157 | Great Britain | July 24, 1939 |
| 511,865 | Great Britain | Aug. 25, 1939 |
| 844,322 | France | Apr. 17, 1939 |